Sept. 8, 1964    D. H. WHITE    3,148,340
TRAVELING WAVE OSCILLATOR STAGES
Filed Sept. 15, 1959    3 Sheets-Sheet 1

INVENTOR
DAVID H. WHITE
BY H. Vincent Harsha
ATTORNEY

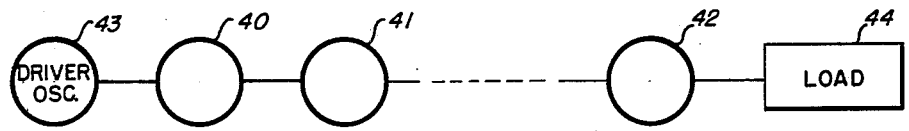
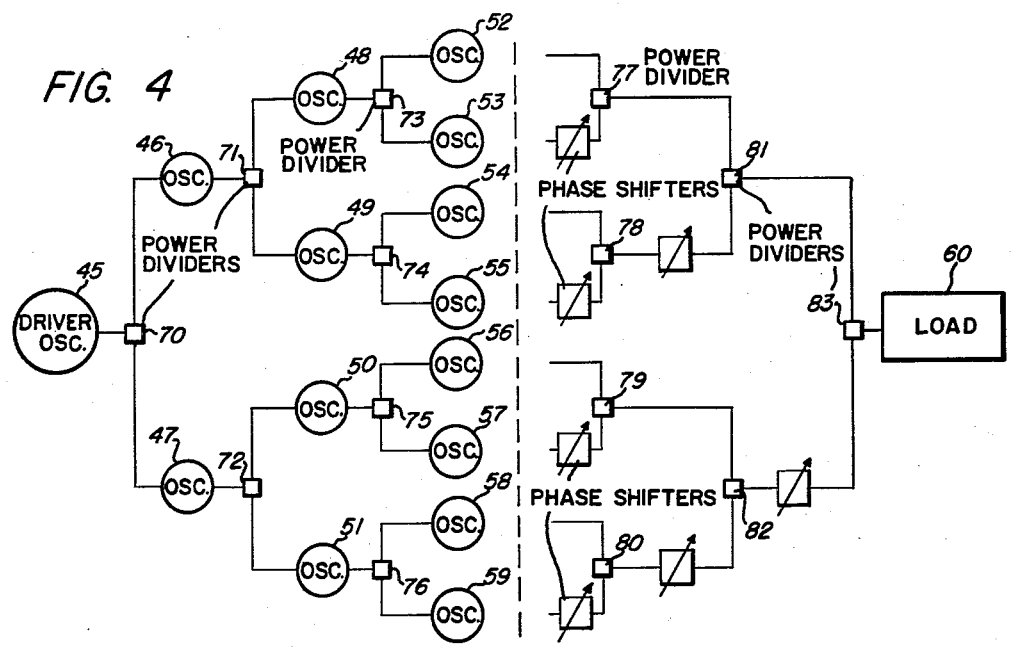
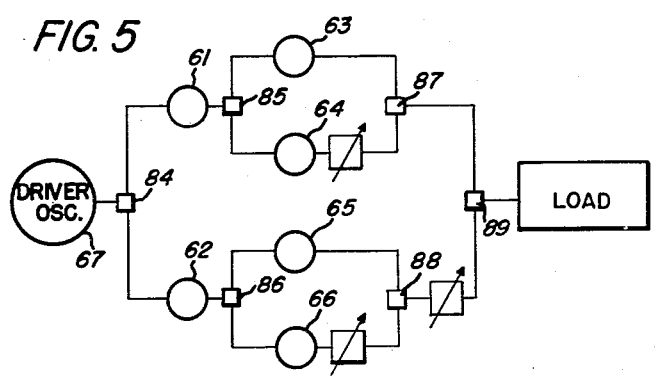

United States Patent Office 3,148,340
Patented Sept. 8, 1964

3,148,340
TRAVELING WAVE OSCILLATOR STAGES
David H. White, Medford, Mass., assignor to Raytheon Company, Lexington, Mass., a corporation of Delaware
Filed Sept. 15, 1959, Ser. No. 840,069
3 Claims. (Cl. 331—56)

This invention relates to a system for increasing the power obtainable from traveling wave oscillators and, more particularly, to a system employing two or more two terminal traveling wave oscillators arranged in a parallel cascade configuration.

Traveling wave oscillators include a periodic slow wave propagating structure and make use of the interaction between an electron beam moving along paths adjacent the periodic structure and the electromagnetic field of the wave guided by said periodic structure. Such oscillator structures are well known in the art.

The electromagnetic field of such a structure is considered to consist of an infinite number of superimposed traveling waves having either positive or negative phase velocities. When the phase velocity is positive, it is in the same direction as the velocity of the energy of the electron beam and is referred to as a forward wave. When the phase velocity is negative, it is in a direction opposite to the electron beam energy velocity and the corresponding waves are then referred to as backward waves.

If the electron beam flows in the direction of one of these backward waves at a velocity substantially equal to the phase velocity of the backward wave, interaction will take place between the beam and the backward traveling wave such that energy is transferred from the beam to the electromagnetic field and the energy given to the backward wave travels along the periodic structure toward the electron beam source. It has been found that two traveling wave oscillators whose free running frequencies are relatively close together may be connected in tandem, that is, with the output from the first or driver tube connected as an input signal to the second or driven tube at the end of the driven tube remote from its output end. It has been found in practice that the power ouput derived from the driven tube may be greater than the combined power output of both tubes operating independently. Such a system is described in Patent No. 2,888,649, "Traveling Wave Tube System," issued to Edward C. Dench and Albert D. LaRue on May 26, 1959.

In general, in systems wherein a plurality of traveling wave oscillators are connected in simple cascade, each oscillator acting as a driver tube for the oscillator that immediately succeeds it, the power that can be obtained reaches a practical limit no matter how many two terminal oscillators are connected together. It can be shown that for $n$ oscillators connected in simple cascade the output power may be expressed according to the following equation:

$$P_n = P_0 r^n + \Delta P \frac{1 - r^n}{1 - r} \quad (1)$$

where $P_0$ is the initial driving power, $r$ is the insertion ratio for each oscillator, $\Delta P$ is the power added by each oscillator due to its own interaction, and $n$ is the total number of oscillators following the initial driving oscillator. As $n$ approaches infinity, the output power approaches a definite limit expressed by the following equation:

$$\lim_{n \to \infty} P_n = \frac{\Delta P}{1 - r} \quad (2)$$

This expression indicates that there is not much to be gained by operating more than a very few oscillators in this simple cascade configuration. Such reasoning is even more conclusive when higher microwave frequencies are involved wherein the insertion loss becomes very large (the insertion ratio $r$ becomes very small).

This invention utilizes a configuration of two terminal traveling wave oscillators which provides greater power than that which is obtained from a simple cascade configuration utilizing the same number of oscillator tubes. In the invention, the oscillators are connected in what is hereinafter referred to as a "parallel cascade" arrangement.

For example, in a single stage, parallel cascade arrangement representing one embodiment of the invention, a pair of two terminal backward wave oscillators is connected in parallel so that each of said oscillators is fed at its input end from a single driver tube. The output power of the driver tube, which may be, for example, a klystron, a magnetron, or other traveling wave type of oscillator, is divided into two substantially equal portions, each of said portions being fed separately to the input terminals of the parallel connected traveling wave oscillators which make up the single, parallel stage. The output power from each of the traveling wave oscillators is combined by suitable combining means, such as a conventional hybrid coupler, and fed to a load. It has been found that the power delivered to the load by such a configuration is greater than that which is obtained from a conventional simple cascade arrangement of two series connected traveling wave oscillators driven by a single driver tube.

The increase in available power obtainable in the parallel cascade arrangement over that obtainable for a simple cascade arrangement using the same number of two terminal oscillators becomes greater as the number of oscillators increases. The reasons for such an increase in power and the operation of such parallel cascade configurations will become more apparent and can be more easily explained with the help of the drawings wherein:

FIG. 3 shows a block diagram of a simple cascade arrangement of $n$ two terminal oscillators;

FIG. 4 shows a block diagram of a parallel cascade arrangement of $s$ stages comprising $n$ two terminal oscillators;

FIG. 5 shows a block diagram of a two-stage parallel cascade arrangement utilizing six two terminal oscillators.

Figure 1:
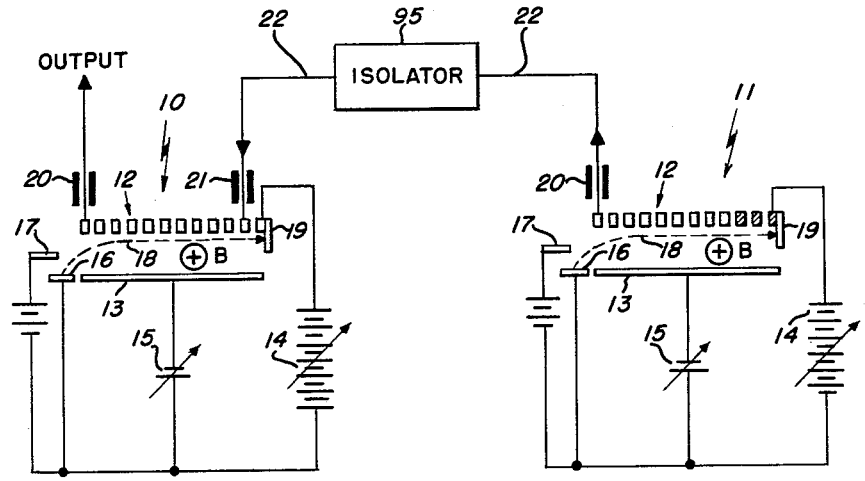
FIG. 1 shows a schematic diagram of a pair of traveling wave oscillators wherein the output of one oscillator is connected to the input terminal of the other two terminal oscillator.

Referring now to FIG. 1, two backward wave oscillators are represented by the reference numerals 10 and 11. These oscillators are indicated schematically in FIG. 1 as linear, for reasons of simplicity. The systems of the invention are not restricted to any particular configuration, however, and oscillators of the non-linear type may be used in accordance with this invention. Each oscillator tube includes a periodic slow wave propagating network or anode delay line 12 shown, by way of example only, as an interdigital line having a plurality of interdigital fingers. Delay line 12 need not be of the interdigital type, however, but may be any suitable periodic delay structure, such as a helix, disc-loaded wave guide, or the like. Each tube includes an elongated electrode or sole 13, which is maintained negative with respect to delay line 12 by means of the unidirectional source of voltage 14 and the unidirectional source of voltage 15 connected between anode delay line 12 and sole 13. An electric field thereby is produced between anode delay line 12 and sole 13.

Each tube further includes an electron gun comprising a cathode 16 and an auxiliary electrode (accelerating anode) 17 for directing a beam of electrons 16 substantially parallel to anode delay line 12 under the influence of the electric field and a magnetic field transverse thereto. The electron beam may impinge on a collector electrode 19 which may be maintained at the same potential as the anode delay line or at some potential positive relative to the cathode. In some instances, collector 19 may be omitted and the electron beam allowed to impinge upon delay line 12; since the region remote from the electron gun is normally an attenuating region, the impingement of the electron beam upon the anode delay line usually is of no consequence.

In the diagram of FIG. 1, the oscillators are of a transverse magnetic field type in which the electron beam is under the combined influence of an electric field and a magnetic field transverse to the electric field; the electron beam is mutually perpendicular to the direction of both fields. This magnetic field is indicated by the letter B and the direction of the field is indicated by a cross within a circle. In tubes of this type, the electron beam velocity is proportional to the ratio of the anode delay line-to-sole voltage and the magnetic field strength (flux density). This invention, however, is applicable equally to an oscillator in which an accelerated electron beam travels in the interaction space adjacent the anode delay line and in which as a magnetic field, if used at all, is an axial field which serves only to focus the electron beam.

Energy is removed from the end of periodic anode delay structure 12 adjacent cathode 16 by means of an output coupling device 20.

In order to achieve proper locking of the oscillators, it is essential that the frequency of operation of each tube, running by itself, be near that of the other tube or tubes, for example, within about 5%. In order to insure that the nominal free running frequencies of operation of the various oscillators do not differ appreciably, it may be necessary to compensate for individual differences in construction and in electrode voltages of the oscillators by means of a variable bias voltage source 15 connected between cathode 16 and sole 13. The bias can be adjusted on each oscillator until the operating frequencies are substantially equal. If the devices have substantially identical characteristics, the bias sources may, of course, be omitted. It has been found that, in many instances, the space charge conditions for a tube being driven and the same tube running freely are slightly different. This may be another reason for utilizing separate bias power supplied for the various tubes.

The driven oscillator tube 10 must be provided with an input coupling device 21 which is coupled to periodic anode delay structure 12 adjacent the end remote from its cathode. Output coupling devices 20 of tubes 10 and 11 may be similar in construction to that of input coupling device 21 and may be coupled to anode delay structure 12 in the same manner. Attenuation may be introduced at the end of tube 11 remote from the output end in a conventional manner. This attenuation may take the form of a thin coating of lossy material such as graphite applied to the end of delay line 12, as by spraying a solution of graphite mixed with a suitable binder, or by coating the delay line with iron by electroplating techniques. The attenuation is indicated in FIG. 1 by cross-hatching or oblique lines drawn through anode delay line 12.

Driver oscillator tube 11 may alternatively be provided with a coupling device 21, such as that provided in tube 10, coupled to the end of anode delay line 12 remote from its cathode. This coupling device may be used to introduce external attenuation by coupling the input end of the tube to an external lossy termination which is of such impedance as to reduce substantially reflections within tube 11.

The advantage accruing from the use of external attenuation is standardization of tubes, whereas the advantage of internal attenuation is that somewhat better impedance matching may be achieved with internal attenuation than with external attenuation. It should be noted, however, that the invention does not necessarily contemplate the use of attenuation; in some instances, the reflected energy may be of insufficient magnitude to prove troublesome.

Energy generated by driving oscillator 11 is removed therefrom by means of output coupling device 20 and is applied to input coupling device 21 of driven oscillator 10 by way of a transmission line 22 which may be, for example, a coaxial line. A non-reciprocal device 95, such as a conventional ferrite isolator, may be introduced in transmission line 22 interconnecting the two oscillators. Isolator 95 is used to prevent energy from returning to the driver tube and, thus, acts as a protective device in case of failure in the driven tube which might cause mismatching such as to result in damage to the driver source.

Figure 2:
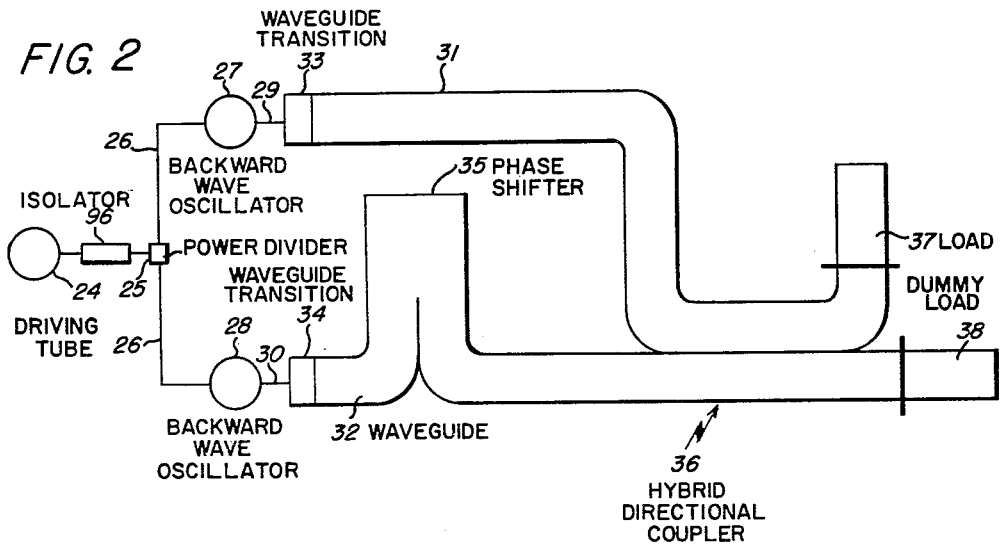
FIG. 2 shows partial schematic and a partial block diagram of a parallel cascade arrangement for a single stage of operation of the invention utilizing a driver tube source and a pair of two terminal backward wave oscillators.

FIG. 2 shows a partial schematic and partial block diagram of a parallel cascade arrangement of two terminal traveling wave oscillators which utilizes a single stage of operation. Since the interconnections between a driver tube and driven tube are clear from the description in FIG. 1, FIG. 2 shows the tubes involved in block diagram form. In that figure, there is shown an input driving tube 24, which may be a conventional magnetron, klystron, or other traveling wave power source. The output of tube 24 is fed to a conventional coaxial power divider 25 through an isolator 96. Power divider 25 divides the output power into two substantially equal portions. The construction and operation of such power dividers is well known in the art and, hence, is not shown or described in detail here. The divided outputs are fed separately by coaxial lines 26 to the input terminals of a pair of two terminal backward wave oscillators 27 and 28. The input terminals are equivalents to terminals 21 shown in FIG. 1, for example. The outputs of oscillators 27 and 28 are fed from their output terminals (equivalent to terminals 20 of FIG. 1, for example) through coaxial cables 29 and 30 to waveguide structures 31 and 32 through transition structures 33 and 34, respectively. In order to combine the output signals from tubes 27 and 28 to obtain maximum output power, it is necessary to provide the correct phase relationship between these signals before combining them in a suitable combining means. This is accomplished by providing a conventional phase shifter 35 for one of the output signals, in this case the signal from oscillator 28. Phase shifter 35 is adjusted to provide maximum power to the load. The signals from wave guide 31 and phase shifter 35 are then combined in a conventional hybrid directional coupler 36 and the combined signal is fed to a load 37. A second dummy load 38 may be arranged at the other output of directional coupler 36 and phase shifter 35 may be adjusted to provide a maximum power in load 37 and a minimum power in dummy load 38.

In the particular configuration that has been constructed according to the diagram shown in FIG. 2, the physical lengths of the transmission lines from the outputs of the oscillators to the junction of the hybrid directional coupler are made approximately equal. Similarly, the physical lengths of the transmission lines 25 to the inputs of tubes 27 and 28 are made approximately equal. This parallel cascade, single stage arrangement provides more power than can be obtained from a simple cascade arrangement utilizing the same number of backward wave oscillators.

The explanation for the increase in power due to parallel cascade operation can be shown by an examination of the general characteristics of parallel and simple cascade arrangements.

In the block diagram of a simple cascade arrangement shown in FIG. 3, there are no substantially identically matched two terminal traveling wave oscillators represented, for example, by oscillators 40, 41, and 42 which are driven from an initial driver stage oscillator 43. Driver oscillator 43 has its output terminal connected to an input terminal of oscillator 40. The output terminal of oscillator 40 is connected to the input terminal of oscillator 41 so that oscillator tube 40 acts in turn as a driver tube for driven oscillator tube 41. Each of the successive oscillators in the simple cascade is similarly driven by the oscillator which immediately precedes it and the $n$th oscillator (represented here as oscillator 42) has its output terminal connected to a load 44.

Each of the two terminal oscillators in this analysis is assumed to have an insertion ratio $r$, which is defined as the ratio of the tube's output power to the tube's input power when the tube is driven, but is passively connected. In addition to the power obtained by reason of its being driven by an input tube, each oscillator adds a fixed amount of power $\Delta P$ due to its own interaction.

It is known that a two terminal crossed field (or M-type) backward wave oscillator will generate a particular amount of power due to its own interaction when it has no driver oscillator connected to its input terminal. The amount of power thus developed is determined by the efficiency of energy transfer effected from the electron beam to the electromagnetic wave. It has been found that the efficiency of energy transfer due to the tube's own interaction is greatly increased when the oscillator is driven by an external source at its input terminal. This increase in efficiency is generally dependent upon the amount of external power inserted and ultimately reaches a maximum beyond which an increase of external power no longer provides an increase in the efficiency of the tube's own interaction. For purposes of this analysis it is assumed that a sufficient amount of input power is inserted at the input of each oscillator to assure a high efficiency so as to provide substantially a maximum value of power $\Delta P$ due to the tube's own interaction.

Under these conditions, the output power $P_k$ of the $k$th oscillator in the simple cascade arrangement of FIG. 3 may be expressed as:

$$P_k = P_{k-1} r + \Delta P \quad (3)$$

where $P_{k-1}$ is the input driving power, which the $k$th oscillator receives from the $(k-1)$th driver oscillator which immediately precedes it. The total power $P_n$, therefore, which is available at the output of $n$ oscillators in simple cascade is given by Eq. 1, which for clarity is repeated here:

$$P_n = P_0 r^n + \Delta P \frac{1 - r^n}{1 - r} \quad (1)$$

As explained previously, the output power $P_n$ approaches a limit as $n$ approaches infinity in accordance with Eq. 2, rewritten below:

$$\lim_{n \to \infty} P_n = \frac{\Delta P}{1 - r} \quad (2)$$

In order to determine the practical limitations of the simple cascade arrangement, it is desirable to determine the maximum number, $n_{max}$, of oscillators which can be arranged in simple cascade and still provide enough additional power to warrant the additional number. In order to determine this maximum number, $n_{max}$ is arbitrarily assumed to be the smallest number for which the addition of one more two terminal oscillator will increase the output power by less than half of the initial drive power $P_0$.

It can be seen from Eq. 1 that the difference $\delta P_n$ in output power between the $n$th and the $n-1$th oscillators can be expressed by the following equation:

$$\delta P_n = P_{n+1} - P_n \quad (4)$$
$$= r^n [\Delta P - P_0 (1 - r)] \quad (5)$$

According to the arbitrary assumption described above, $$\delta P_n = \frac{P_0}{2}$$

Solving Eq. 4 for $n$ results in the following expression:

$$n_{max} = \frac{\log\left[\frac{P_0}{2} \frac{1}{\Delta P - P_0(1 - r)}\right]}{\log r} \quad (6)$$

If, as an example, $P_0 = 200$ watts, $\Delta P = 400$ watts and $r = 0.8$, $n_{max}$ is approximately equal to 6. If Eq. 1 is evaluated for $n = 6$, the output power $P_n$ is equal to 1530 watts, for a simple cascade arrangement of six traveling wave two terminal oscillators. The addition of another oscillator increases the output power by less than 100 watts.

In order to see the advantages of the parallel cascade system, the following analysis offers a comparison of the parallel system with the above analysis of the simple series system. A parallel cascade arrangement comprising S stages of $n$ oscillators is shown in FIG. 4 in block diagram form, each stage having $2(2^S - 1)$ oscillators.

The first stage comprises oscillators 46 and 47, driven by initial driver oscillator 45 through power divider 70 as explained with reference to FIG. 2. The output power from oscillator 46 is divided into two substantially equal portions by power divider 71 and these portions in turn are used to drive oscillators 48 and 49 which make up a portion of the second stage. Oscillator 47 similarly drives oscillators 50 and 51 through power divider 72 and the latter oscillators make up the rest of the second stage. Oscillators 52–59 make up the third stage and are driven by oscillators 48–51 of the second stage through power dividers 73–76. The outputs of the oscillators in the $S$th stage are combined by a suitable configuration of directional couplers, some of which (77–83) are shown here, and the combined signal is ultimately fed to a load 60. The output power of S stages can be expressed according to the following equation:

$$P_S = P_0 r^S + 2 \Delta P \frac{(2^S - r^S)}{2 - r} \quad (7)$$

It can be seen that as S becomes very large, $P_S$ increases without limit.

From Eq. 7, it is now possible to compare the power attainable from equal numbers of two terminal oscillators in simple and parallel cascade arrangements. For example, in a two stage, parallel cascade system there are six two terminal oscillators 61–66 as shown in FIG. 5. Initial driver oscillator 67, power dividers 84–86, and directional couplers 87–89 are also utilized in the system shown. If, from Eq. 7, we calculate the power attained with such a parallel arrangement utilizing the same nominal values for $P_0$, $\Delta P$, and $r$ as used above in the simple cascade analysis, it is found that the total power for two stages (six oscillators) is equal to 2370 watts, which represents almost 50 percent more power than is derived from the use of six two terminal oscillators in simple cascade. It can be seen that the parallel cascade connection is most advantageous when dealing with tubes having large insertion loss (small $r$), a condition which occurs at very high frequency operation.

Figure 6:
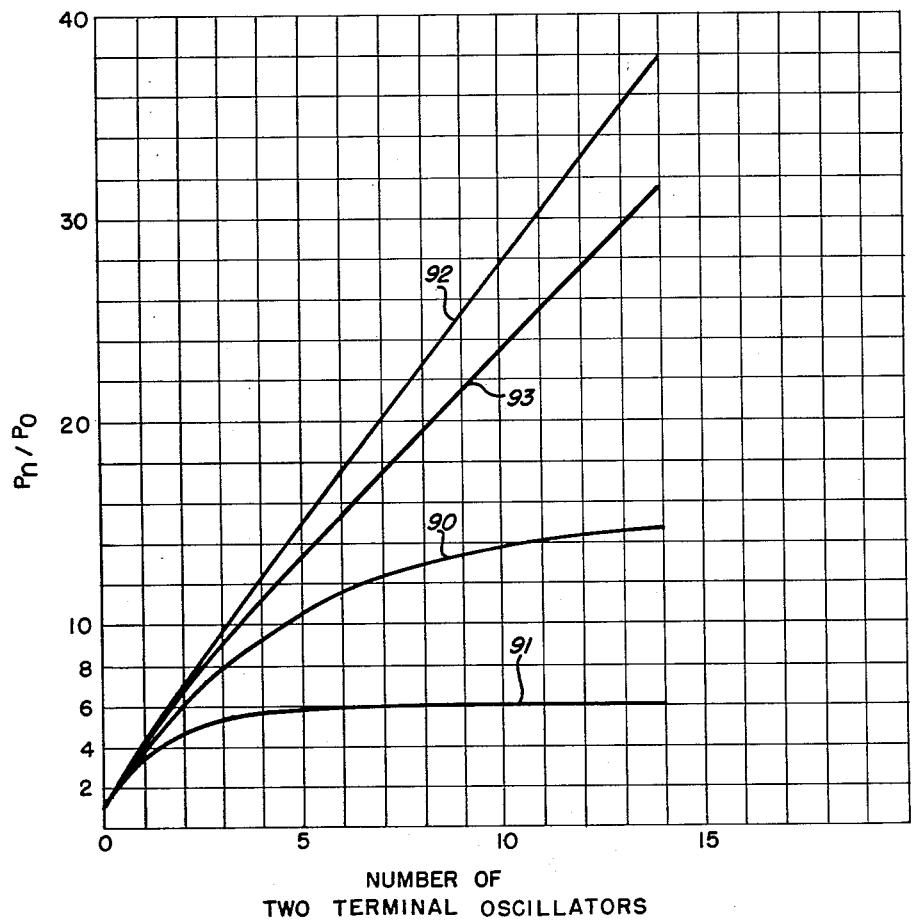
FIG. 6 shows a graph which compares the relative amounts of power available from simple and parallel cascade arrangements as a function of the total number of two terminal oscillators utilized in each arrangement.

The graph presented in FIG. 6 shows a comparison of output power, normalized with respect to $P_0$ (expressed in the graph as $P_n/P_0$), for simple and parallel cascade arrangements for a nominal ratio of $$\frac{\Delta P}{P_0}=3$$

that is, where each oscillator provides three times as much power due to its own interaction as the initial driver oscillator power $P_0$. Curve 90 shows a curve of $P_n/P_0$ for a simple cascade arrangement wherein the insertion ratio $r$ equals 0.8. Curve 91 shows a similar curve for a simple cascade arrangement for an insertion ratio of 0.5. Curves 92 and 93 show curves of $P_n/P_0$ for a parallel cascade arrangement for insertion ratios of 0.8 and 0.5, respectively. The advantage of the parallel cascade arrangement is easily recognized from a comparison of these curves.

A further comparison which can be made between the simple and parallel cascade arrangements may provide more insight into the advantages provided by the latter arrangement. The total available power per oscillator may be defined as $$P_N=\frac{P_n}{N}$$

where N is the total number of oscillators used. For a simple cascade arrangement, $$P_N=P_0\frac{r^n}{N}+\frac{\Delta P}{N}\frac{(1-r^n)}{(1-r)} \qquad (8)$$

For a parallel cascade arrangement, $$P_N=P_0\frac{r^s}{2(2^s-1)}+\frac{\Delta P}{2^s-1}\frac{2^s-r^s}{2-r} \qquad (9)$$

If $r$ equals 1 (no insertion loss) both arrangements provide a limit for $P_N=\Delta P$, as N approaches infinity. If $r$ equals 0 (100% insertion loss) then, as N approaches infinity, the simple cascade arrangement gives an available power $P_N$ of 0, while the parallel cascade arrangement gives an available power $P_N$ of $\Delta P/2$. Thus, as the insertion loss becomes greater, the advantage of the parallel arrangement becomes more pronounced.

It is obvious that many variations in the parallel cascade arrangement will occur to those skilled in the art within the scope of the invention. For example, the power from the output driver source or the power obtained from any of the outputs of the two terminal oscillators may be divided into more than two portions, said portions not necessarily being substantially equal.

One alternative arrangement, for example, is to provide a configuration utilizing only a single stage comprising a plurality of parallel connected oscillators each driven by a portion of the power obtained from a single driving power source. The outputs from the oscillators are then combined to provide a load signal. If the external power source driving the oscillators provides sufficient power to cause them to operate at a high efficiency, the output load signal will be greatly increased over a simple cascade arrangement utilizing the same number of oscillators.

The configuration of FIGS. 4 and 5 may be described as one wherein the number of oscillators in each stage is expressed as $2^k$ where $k$ is the number of the stage under consideration ($k=1, 2, 3, 4$ . . . etc.). It is possible to arrange the stages so that the number of oscillators in each stage may be expressed as $a^k$ where $a$ is greater than two and $k$ is again the particular stage under consideration ($k=1, 2, 3, 4$ . . . etc.).

Many other possible configurations of parallel connected two terminal oscillators will occur to those skilled in the art without departing from the scope of this invention. The invention is not limited to the specific two terminal oscillators described herein. The term traveling wave oscillators as used in this description and in the appended claims is deemed to include any two terminal oscillator or amplifier tubes of the beam type, crossed field type, or other space charge control types. The invention is, therefore, not to be construed as limited to the specification system shown and described herein except as defined in the appended claims.

What is claimed is:

1. In combination, an input energy source for supplying an external signal having a predetermined frequency; means for dividing said input energy signal into two input portions; a first stage comprising a pair of traveling wave oscillators having input and output coupling means, said two input portions being connected to the input coupling means of said traveling wave oscillators in said first stage; means connected to the output means of said first stage traveling wave oscillators for dividing the output signal from each of said oscillators into a pair of intermediate signals; a second stage of traveling wave oscillators comprising four traveling wave oscillators having input and output coupling means, the input coupling means of each of said second stage oscillators being connected to said intermediate signals from said first stage; means connected to the output means of said second stage traveling wave oscillators for combining the output signals from said second stage traveling wave oscillators; means for coupling said combined signals to a load means.

2. In combination, an input energy source for providing an external signal; means connected to said input energy source for dividing said external signal into two substantially equal portions; a plurality of interconnected oscillator stages each of said stages having a plurality of traveling wave oscillators having input and output coupling means; a first of said stages comprising a pair of traveling wave oscillators and each of said succeeding ones of said stages having a number of traveling wave oscillators equal to twice the number of traveling wave oscillators in the immediately preceding stage; means connected to the output means of each of said traveling wave oscillators in each of said stages except the last of said stages for dividing the output energy from said traveling wave oscillators into two substantially equal output portions; means for connecting said output portions from said traveling wave oscillators from each of said stages except said last stage to the input coupling means of said traveling wave oscillators in the immediately succeeding stages; means for connecting said two substantially equal portions from said external signal to the input coupling devices of said pair of traveling wave oscillators in said first stage; means connected to the output means of said traveling wave oscillators in said last stage for combining the output signals from said last stage traveling wave oscillators; means for coupling said combined output signals from said last stage to a load means.

3. In combination, an input energy source for providing an external signal; means connected to said input source for dividing said external signal into a plurality of input portions; a plurality of interconnected oscillator stages each including a plurality of traveling wave oscillators having input and output coupling means; the number of traveling wave oscillators in a first of said stages being equal to the number of said plurality of input portions from said input energy source; means connected to the output means of each of said traveling wave oscillators in each of said stages except the last of said stages for dividing the output energy from each of said traveling wave oscillators into a plurality of output portions; each of said stages having a number of traveling wave oscillators equal the number of output portions from the traveling wave oscillators in the immediately preceding stage; means for connecting said output portions from said traveling wave oscillators from each of said stages except said last stage to the input coupling means of said traveling wave oscillators in the immediately succeeding stages; means for connecting said plurality of input portions from said external signal to the input coupling means of said plurality of traveling wave oscillators in said first stage; means connected to the output means of said traveling wave oscillators in said last stage for combining the output signals from said last stage traveling wave oscillators; means for coupling said combined output signals to a load means.

References Cited in the file of this patent

UNITED STATES PATENTS

| | | |
|---|---|---|
| 2,605,383 | Spencer | July 29, 1952 |
| 2,630,547 | Dodds | Mar. 3, 1953 |
| 2,842,667 | Dench et al. | July 8, 1958 |
| 2,888,649 | Dench et al. | May 26, 1959 |
| 2,925,529 | Cutler | Feb. 16, 1960 |